United States Patent [19]

Desmarais

[11] 3,891,582

[45] June 24, 1975

[54] JOINT CEMENT COMPOSITIONS UTILIZING WATER-INSOLUBLE CARBOXYMETHYLATED CELLULOSE DERIVATIVES AS ASBESTOS SUBSTITUTES

[75] Inventor: Armand J. Desmarais, New Castle, Del.

[73] Assignee: Hercules Incorporated, Wilmington, Del.

[22] Filed: Apr. 26, 1973

[21] Appl. No.: 354,834

[52] U.S. Cl. ........ 260/17 R; 161/250; 260/29.6 PS; 260/8; 106/141
[51] Int. Cl.² ...... C08F 45/18; C04B 31/36; C04B 11/08
[58] Field of Search ............... 260/17 R, 29.6 PS, 8

[56] References Cited
UNITED STATES PATENTS

| | | | |
|---|---|---|---|
| 2,986,544 | 5/1960 | Driscoll | 260/17 R |
| 3,003,979 | 10/1961 | Ptosienski | 260/17 |
| 3,297,601 | 1/1967 | Maynard et al. | 260/17 R |
| 3,303,147 | 2/1967 | Elden | 260/17 |
| 3,793,269 | 2/1974 | Bruschtein et al. | 260/17 R |

*Primary Examiner*—Melvin Goldstein
*Assistant Examiner*—Peter F. Kulkosky
*Attorney, Agent, or Firm*—William S. Alexander

[57] ABSTRACT

Joint cements suitable for use with plaster wallboard are disclosed wherein the asbestos customarily used to impart water binding properties and pseudoplasticity is replaced by a substantially water-insoluble, fibrous, carboxymethylated cellulose derivative.

1 Claim, No Drawings

JOINT CEMENT COMPOSITIONS UTILIZING WATER-INSOLUBLE CARBOXYMETHYLATED CELLULOSE DERIVATIVES AS ASBESTOS SUBSTITUTES

This invention relates to compositions useful as joint sealing materials for the installation of wallboard paneling in, e.g., residential and office building construction. More specifically, it refers to such compositions wherein a cellulose derivative containing carboxyl groups is employed to impart desirable properties thereto.

Since the end of the second World War, the use of wallboard has all but displaced plaster in erection of interior walls in the construction of buildings. Wallboard is generally installed in 4 × 8 foot panels which are nailed and glued to the studding of the wall and fitted together until the entire section of wall is covered. The joints where sections of the board are butted together are covered with tape and then the taped joints and all nails are covered with a joint cement or "spackling" compound which, upon hardening, can be sanded smooth so that it is imperceptible under paint or wallpaper.

Joint cements heretofore employed with wallboard have contained a resinous binder, limestone, clay, mica, and asbestos as the principal dry ingredients which were mixed with water to form a dope. Asbestos is included in these formulations for several purposes. It imparts lubricity, workability, water binding, and pseudoplasticity to the wet mix and, being fibrous, provides reinforcement of the cement on drying.

Recently disclosed evidence that certain types of asbestos may have carcinogenic characteristics has prompted issuance of severely restrictive regulations by OSHA regarding its use in construction applications and may eventually lead to its being banned altogether. For this reason, an effort is now under way to find substitutes to replace asbestos in most of its present applications.

According to this invention, it has been found that certain cellulose derivatives can be used as a replacement for asbestos in joint cements. More specifically, this invention relates to joint cement compositions based on a resinous binder, mica, clay, and limestone as major dry components, along with a fibrous, carboxymethylated, substantially water-insoluble cellulose derivative selected from the class consisting of cross-linked carboxymethylcellulose (CMC), carboxymethylcellulose having a minimum degree of substitution of 0.2 and a maximum degree of substitution (D.S.) of about 0.5 and carboxymethyl hydroxyethyl cellulose (CMHEC) having a minimum carboxymethyl D.S. of 0.1, a maximum carboxymethyl D.S. of about 0.4 and a maximum combined carboxymethyl D.S. and hydroxyethyl M.S. of about 0.7. Joint cements are marketed as fully formulated, ready-to-use cement, i.e., already containing water, and as a dry powder to which water is added at the time of use. The invention includes such dry powders as well as the fully formulated cements. Joint cement compositions of this invention are substantially equivalent in performance to those which are presently available commercially and, based on current price levels, they are competitive in price.

The degree of substitution (D.S.) is defined as the average number of hydroxyl groups per anhydroglucose unit which are substituted with carboxymethyl groups.

The molecular substitution (M.S.) is defined as the average number of moles of hydroxyethyl substituent present per anhydroglucose unit.

In commercial practice the concentrations of the principal ingredients can and do vary widely between suppliers and depending on the intended end use, i.e., whether it is for patching holes, covering nail pops, or for initially covering taped joints. Most commercial formulations are within the following concentration ranges:

| | |
|---|---|
| Calcium carbonate | 190 to 350 parts by weight |
| Mica | 30 to 90 parts by weight |
| Clay | 0 to 100 parts by weight |
| Binder | 20 to 44 parts by weight |

If the product is to be sold as a ready-mix formulation, water in the amount of about 30 to 40%, based on the total weight of the dry ingredients is added and thoroughly mixed.

All compositions within the limits just described are suitable for manual application by troweling. When they are to be applied mechanically, additional water is added at the job site just prior to use.

The cellulose derivatives which are employed in this invention are all substantially water-insoluble fibrous materials. By substantially water-insoluble is meant that a substantial portion, at least about 25% of the material, is completely insoluble in water at any concentration. These materials, however, have a relatively high affinity for water, being able to absorb and retain about 10 to 50 grams of water per gram of the cellulose derivative. In the case of the CMHEC and the low D.S. carboxymethylcellulose, the low water solubility is a result of a relatively low and nonuniform substitution level. The cross-linked carboxymethylcellulose is a normally water-soluble carboxymethylcellulose which is made water-insoluble by having been cross-linked. The water insolubility is a critical factor in the performance of these materials as asbestos substitutes. A water-soluble uncross-linked material such as conventional carboxymethylcellulose having a D.S. greater than 0.5 or CMHEC having a carboxymethyl D.S. greater than 0.4 and a combined carboxymethyl D.S. and hydroxyethyl M.S. greater than 0.7 at economical concentration levels, functions as a dispersant for the materials in the mix and a mix based on one of these materials would not have the consistency needed for pseudoplasticity.

The carboxymethylcellulose can be cross-linked by an organic reagent which is difunctional with respect to cellulose. Such reagents include, e.g., formaldehyde, epichlorohydrin, bis-epoxypropyl ether, divinyl sulfone, dichloroethane, 2,2'-dichloroethyl ether and other similarly substituted materials. Cross-linking is preferably carried out according to the "wet" process described in U.S. Pat. No. 3,589,364 so that the fibrous state of the carboxymethylcellulose is preserved. In this process, the fibrous carboxymethylcellulose is slurried in an organic diluent and an amount of water just sufficient to swell the fibers without destroying the fibrous structure. The cross-linker, preferably epichlorohydrin, is reacted with this mixture for about 24 hours at about 25°C. The cross-linking level need only be sufficient to impart water insolubility. This can be done by about 0.12 to 0.18 mole of cross-linker per mole of carboxymethylcellulose.

To duplicate the properties of conventional joint cements, the concentration of the carboxymethylated cellulose derivative can be about one-sixth to less than one-twelveth that of the asbestos being replaced, due to the superior water-binding capacity of the cellulose derivative as compared with asbestos. Thus, the concentration of the additive can be about 0.5 to 1.5% based on the total dry weight of the formulation. Employing conventional joint cement recipes, the additional weight of asbestos, not replaced by cellulose derivative, is replaced by additional limestone or mica so that the total weight of product remains the same.

As suggested previously, it is important that the carboxymethylated derivative be in fibrous form. For best results the fiber length should be between about 0.03 and 0.007 inches. If the fiber length becomes too great the resulting cement composition is curdy and not satisfactory. On the other hand, if the fibrous form is lacking, the water-binding capacity of the derivative is not sufficient to reproduce the properties of conventional joint cements. The stated particle size range includes the particles which will pass through a 20 mesh screen and be held on an 80 mesh screen.

In some cases, the carboxymethylated derivative alone can give the composition sufficient body for application to a vertical wall without sagging or melt-down. In other cases, additives can be added to increase the body or structure to the necessary level. Materials useful for this purpose include, e.g., cellulose fibers in various forms, treated clays, and porous stone flour. When structure additives of this type are added, they normally replace a portion of the inert fillers, i.e., the limestone, mica or clay.

The resinous binder is normally a coalescable vinyl material, preferably poly(vinyl acetate) which upon drying or curing of the cement forms a thin matrix to hold the clay, limestone, etc. When a fully formulated mix is being prepared, the binder is usually added as an aqueous latex. In the case of dry mixes it is added as spray-dried latex particles. Other materials useful as the binder include, e.g., starch, casein, polyacrylamide, copolymers of acrylamide and acrylic acid.

In addition to the principal ingredients mentioned above, a typical joint cement will frequently also contain a dispersant, a defoamer, a preservative and a thickener.

In the following examples, the invention is illustrated. Parts and percentages are by weight unless otherwise indicated. The following general procedure was employed to mix the ingredients:

In preparing a ready-mix formulation the water and binder latex were charged to a mixing apparatus and mixed for a short time before the dispersant, defoamer, and preservative were added. The dry ingredients (limestone, mica, clay, carboxymethylated cellulose derivative, and structure additives, if used) were dry blended and added incrementally to the stirred liquids. After the last of the dry ingredients was added, the mix was stirred for about another 10 minutes at low speed with occasional stopping to scrape down the sides of the bowl.

To characterize the products prepared in the examples, the following tests were used:

Viscosity: measured in Brabender units (B.U.) determined by ASTM C 474-67.

Cracking: Panels are dried in an essentially vertical position with a current of air from a 14 inch oscillating fan forced across their face from about 30 inches for 45 minutes. The panels are then allowed to dry overnight in the vertical position without the air current. Ratings are assigned subjectively as: none (N), very slight (V.S.), slight (S), moderate (M), or heavy (H).

Melt-Down: Panels of the cement about 4 × 5 × ⅛ inch are cast. Melt-down is observed as sag at the edges of the panels. Ratings: Excellent: structure of cast panel is retained with sharp edges. Slight: edges of panel are slightly rounded. Moderate: edges are slightly more rounded. Poor: edges of panel smooth and tapered.

Adhesion: By ASTM test C 474-67.

EXAMPLE 1

Using the procedure set forth above, a joint cement composition was prepared using the following formulation:

|  | Ex. 1 | | Control | |
| --- | --- | --- | --- | --- |
| Limestone (98% $CaCO_3$) | 294 | parts | 250 | parts |
| Mica (325 mesh) | 76 | " | 76 | " |
| Clay | 76 | " | 76 | " |
| Latex binder | 61 | " | 61 | " |
| Dispersant | 4 | " | 4 | " |
| Preservative | 0.2 | " | 0.2 | " |
| Water | 280 | " | 280 | " |
| Defoamer | 4.6 | " | 4.6 | " |
| Hydroxyethyl cellulose | 2 | " | 2 | " |
| Asbestos (5–1000$\mu$) | 0 | " | 48 | " |
| CMC | 4 | " | 0 | " |

The carboxymethylcellulose employed in this example was prepared from high quality cotton linters, had a D.S. of 0.7, and was cross-linked with 0.012 gram of epichlorohydrin per gram of carboxymethylcellulose. Its water retention capability amounted to 42.5 grams/gram. The fibrous material had a maximum fiber length of 0.03 inch and a minimum of 0.007 inch.

The latex binder was a 55% aqueous poly(vinyl acetate) dispersion containing a plasticizer. The dispersant was a polymerized sodium salt of a sulfonic acid sold under the trade name Daxad 30. The defoamer was a silica dispersion in a hydrocarbon solvent and the preservative was a mercurial fungicide compound.

The properties of cements prepared as described are shown in the following table:

| | Viscosity | Density (lbs./gal) | Cracking | % Shrinkage | Appearance | Structure* | Melt-Down | Adhesion |
| --- | --- | --- | --- | --- | --- | --- | --- | --- |
| C | 560 | 12.42 | S | 24 | Creamy | Excellent | Excellent | Satisfactory |
| Ex. 1 | 550 | 12.51 | N | 18.8 | Creamy | Good | Good | Satisfactory |

*Pseudoplasticity

EXAMPLES 2 TO 5

The procedure and the formulation set forth for Example 1 were repeated using the following carboxymethylcellulose modifications in place of asbestos:

Example 2 — D.S. 0.7, based on fine cut chemical cotton, epichlorohydrin/CMC ratio = 0.0132, fiber length 0.03 to 0.007 inch.

Example 3 — D.S. 0.7, based on fine cut chemical cotton, epichlorohydrin/CMC ratio = 0.0106, fiber length 0.03 to 0.007 inch.

Example 4 — D.S. 0.4, uncross-linked, based on wood pulp, fiber length 0.03 to 0.007 inch.

Example 5 — D.S. 0.4, based on wood pulp, epichlorohydrin/CMC ratio = 0.012, fiber length 0.03 to 0.007 inch.

Properties of these cements are recorded in the following table:

| Ex. No. | Viscosity | Density (lbs./gal.) | Cracking | % Shrinkage | Appearance | Structure | Melt-Down | Adhesion |
|---|---|---|---|---|---|---|---|---|
| 2 | 580 | 12.69 | None | 16.8 | Creamy | Good | Good | Satisfactory |
| 3 | 790 | 12.65 | None | 16.8 | Viscous | Excellent | Excellent | Satisfactory |
| 4 | 410 | 12.74 | None | 23.8 | Smooth | Good | Good | Satisfactory |
| 5 | 490 | 12.62 | None | — | Smooth | Good | Good | Satisfactory |

EXAMPLES 6 TO 14

In these examples joint cements were prepared using the following basic formulation:

| | |
|---|---|
| Limestone | 188.8 parts |
| Mica | 50.8 " |
| Clay | 50.8 " |
| Latex binder | 40.8 " |
| Dispersant | 2.8 " |
| Preservative | 2.0 " |
| Water | 186.9 " |
| Defoamer | 2.8 " |
| HEC | 1.3 " |
| CMC | 2 " |

The CMC was a substantially water-insoluble high viscosity product having a D.S. of about 0.4. To this basic formulation were added varying amounts of a structure-producing additive as follows:

Ex. 6 — 3.0 parts unbleached kraft pulp
Ex. 7 — 5.0 parts fine cut chemical cotton
Ex. 8 — 2.0 parts hydroxypropylated montmorillonite clay
Ex. 9 — 1.0 part hydroxypropylated montmorillonite clay
Ex. 10 — 1.5 parts hydroxypropylated montmorillonite clay
CMC reduced to 1.5 parts, limestone increased to 189.3
Ex. 11 — 1.0 part hydroxypropylated montmorillonite clay
CMC reduced to 1.5 parts, limestone increased to 189.3
Ex. 12 — 3.0 parts hydroxypropylated montmorillonite clay
CMC reduced to 1.0 part, limestone increased to 189.8
Ex. 13 — 5.0 parts hydroxypropylated montmorillonite clay
CMC reduced to 0.5 part, limestone increased to 190.3
Ex. 14 — 3.5 parts hydroxypropylated montmorillonite clay
CMC reduced to 0.5 part, limestone increased to 190.3.

Properties of these materials are recorded in the following table:

| Ex. No. | Viscosity | Cracking | Melt-Down | Adhesion |
|---|---|---|---|---|
| 6 | 780 | Slight | Slight | Good |
| 7 | 640 | None | Slight to Moderate | Good |
| 8 | 620 | V. Slight | Slight | Good |
| 9 | 560 | None | Slight | Good |
| 10 | 570 | None | Slight | Good |
| 11 | 535 | None | Slight to Moderate | Good |
| 12 | 500 | Slight | Excellent | Good |
| 13 | 740 | None | None | Good |
| 14 | 430 | None | Excellent | Good |

EXAMPLES 15 TO 17

The same basic formulation as was used in Example 1 was prepared except that the CMC was replaced as follows:

Ex. 15 — carboxymethyl hydroxyethyl cellulose based on wood pulp and having carboxymethyl D.S. of 0.3 and hydroxyethyl M.S. of 0.4

Ex. 16 — carboxymethyl hydroxyethyl cellulose based on wood pulp and having carboxymethyl D.S. of 0.2 and hydroxyethyl M.S. of 0.5

Ex. 17 — carboxymethyl hydroxyethyl cellulose based on wood pulp and having carboxymethyl D.S. of 0.4 and hydroxyethyl M.S. of 0.3.

The properties of these cements are recorded in the following table:

| Ex. No. | Viscosity | Density (lbs./gal.) | Cracking | % Shrinkage | Appearance | Structure | Melt-Down | Adhesion |
|---|---|---|---|---|---|---|---|---|
| 15 | 590 | 12.70 | N | 22.8 | Creamy | Good | Slight | Satisfactory |
| 16 | 510 | 12.65 | N | 20.6 | Creamy | Good | Slight | Satisfactory |
| 17 | 690 | 12.68 | N | 19.9 | Creamy | V. Good | Slight | Satisfactory |

EXAMPLE 18

The following ingredients were dry mixed by tumbling them together:

| | |
|---|---|
| Limestone | 294 parts |
| Mica | 76 parts |
| Clay | 76 parts |
| Binder* | 34 parts |
| CMC** | 4 parts |
| Hydroxyethyl cellulose*** | 2 parts |

*spray dried poly(vinyl acetate) latex
**D.S. 0.4, 0.03 to 0.007 inch fibers
***M.S. 2.5, 2000 cps to 1% water solution.

To the above dry mix was mixed 280 parts of water, the mix was allowed to slake for 20 minutes and was then mixed again to uniform consistency and evaluated as in the previous examples. Results were as follows:

| Viscosity | Density (lbs./gal.) | Cracking | % Shrinkage | Appearance | Structure | Melt-Down | Adhesion |
|---|---|---|---|---|---|---|---|
| 520 | 12.8 | N | 20.6 | Creamy | Good | Slight | Satisfactory |

What I claim and desire to protect by Letters Patent is:

1. A joint cement composition consisting essentially, by weight, of 20 to 44 parts of a binder selected from the class consisting of poly(vinyl acetate), polyacrylamide, and copolymers of acrylamide and acrylic acid, 30 to 90 parts of mica, 0 to 100 parts of clay, and 190 to 350 parts of limestone as its principal dry ingredients, and containing about 0.5 to 1.5% by weight, based on the total weight of the dry components, of a fibrous, substantially water-insoluble carboxymethylated cellulose derivative having a fiber length of about 0.03 to 0.007 inch and selected from the class consisting of cross-linked carboxymethylcellulose, carboxymethylcellulose having a D.S. of about 0.2 to 0.5 and a carboxymethyl hydroxyethyl cellulose having carboxymethyl D.S. of about 0.1 to 0.4 and a maximum combined carboxymethyl D.S. and hydroxyethyl M.S. of about 0.7.

* * * * *